UNITED STATES PATENT OFFICE.

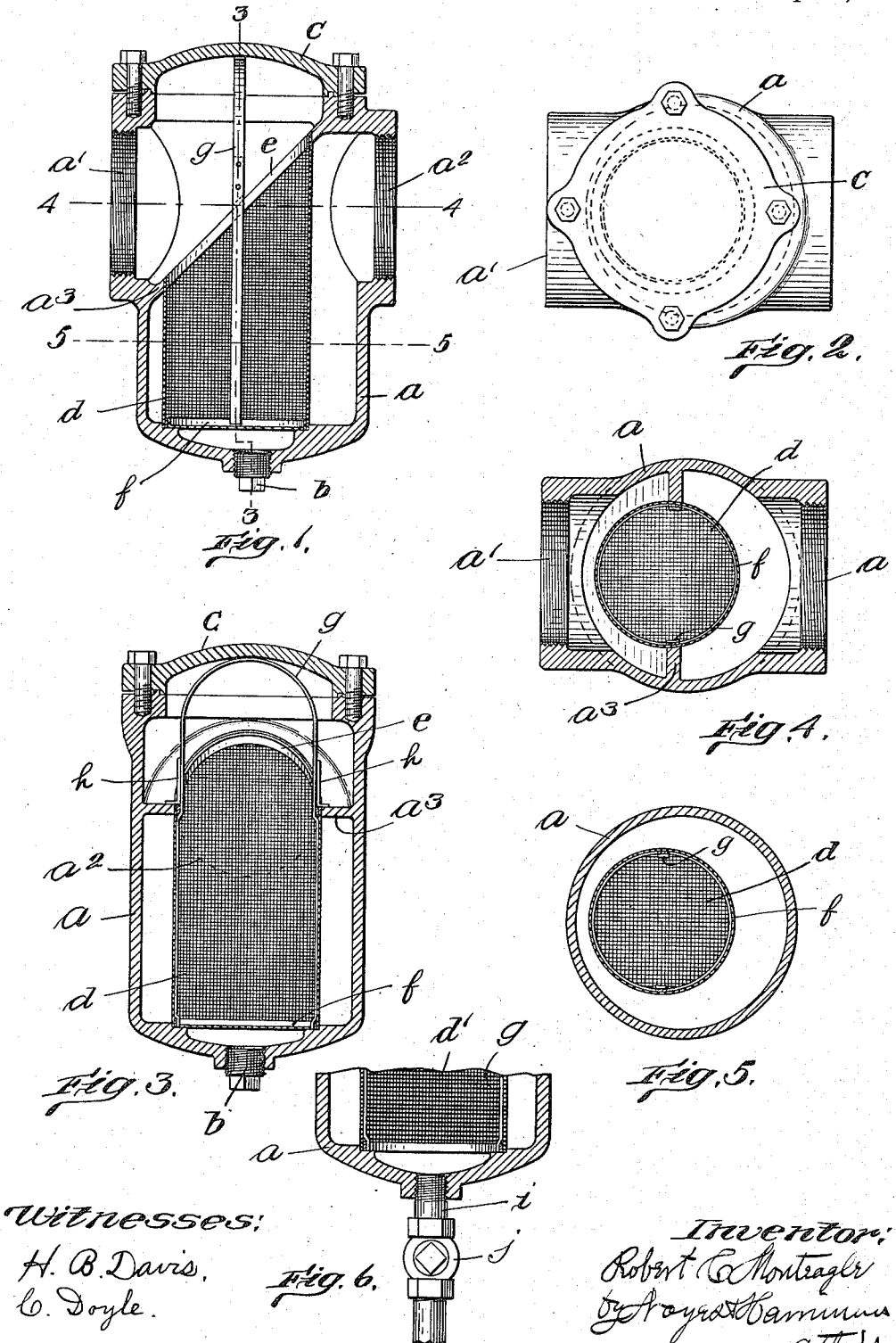

ROBERT CHARLES MONTEAGLE, OF WEST NEWTON, MASSACHUSETTS.

PIPE-STRAINER.

1,152,831.   Specification of Letters Patent.   Patented Sept. 7, 1915.

Application filed May 5, 1914. Serial No. 836,539.

*To all whom it may concern:*

Be it known that I, ROBERT C. MONTEAGLE, a citizen of the United States, residing at West Newton, in the county of Middlesex and State of Massachusetts, have invented an Improvement in Pipe-Strainers, of which the following is a specification.

This invention relates to an improvement in strainers, which are particularly designed for use in connection with water conducting pipes for the purpose of collecting particles of foreign matter carried by the same.

The object of my invention is to provide a strainer of simple and durable construction, which will have a straining surface of as large an area as practicable and which will obstruct the flow therethrough to a minimum extent, and, further, to provide a form of strainer from which the matter collected thereby may be readily removed.

I accomplish these objects by the means shown in the accompanying drawings, in which,—

Figure 1 is a central longitudinal section of a strainer device embodying my invention. Fig. 2 is a plan view thereof. Fig. 3 is a cross sectional view on the line 3—3 of Fig. 1. Fig. 4 is a horizontal sectional view on the line 4—4 of Fig. 1. Fig. 5 is a similar view on the line 5—5 of Fig. 1. Fig. 6 is a sectional view of the bottom portion, showing a modification.

As shown in the drawing, my device comprises a casing, or chamber $a$ of substantially cylindrical form, having an inlet port $a'$ in one side and a discharge port $a^2$ in the opposite side, arranged in alinement, said ports being internally threaded to permit inlet and discharge pipes, respectively, to be screwed therein. Said chamber is extended downwardly for a suitable distance below said ports to provide a strainer-receiving chamber, the bottom of which is provided with a clean-out opening adapted to be closed by a screw plug $b$, and the top of which is provided with a strainer opening, adapted to be closed by a cover $c$. Said casing is further provided with an internally projecting rib $a^3$, which extends continuously about the inner wall of the casing, and is disposed in a plane which extends obliquely upward, at an angle of approximately 45°, from points adjacent and below the inlet port $a'$ to points adjacent and above the outlet port $a^2$, thus forming an elliptical-shaped passage between said ports. The edge, or end surface of said rib extends vertically and parallel to the side wall of the casing $a$, so that, while the passage encircled by said rib is elliptical in form, the vertical projection of the edge of said rib is circular, as shown in Fig. 4.

A strainer $d$, composed of a wire mesh, or other suitable straining material, is provided, said strainer being of cylindrical form and being closed at the bottom and open at the top, so that it is of bucket-like construction, and the diameter thereof being such that it may be placed in the casing through its top opening and through the passage encircled by said rib $a^3$, and, when in this position, will fit closely against the edge of said rib. The upper edge of the strainer is disposed in a plane of the same obliquity with relation to its side wall, as is the plane of rib $a^3$ to the side wall of the casing and is of such height, that, when the strainer is placed in position in the casing, so that it rests on the bottom thereof, its said upper edge will be flush with the upper surface of said rib. The upper edge portion of said strainer has an internally arranged reinforcing rim, or band $e$, secured thereto, and a stiffening band $f$ is secured to the side of the strainer at its bottom, said bands $e$ and $f$ being connected to the arms of a bail $g$, which extends into the strainer at opposite sides thereof. Angle irons, or lugs $h$ are fastened to the bail $g$ in position to rest on the rib $a^3$ when the strainer is in position. The elliptical passage encircled by said rib $a^3$ is so arranged with relation to the inner surface of the cylindrical side wall of the casing that the lower portion thereof, adjacent the inlet port, is materially nearer the adjacent side wall portion of the casing, than is the highest portion, adjacent the outlet port, to the side wall portion of the casing, directly opposite and adjacent the outlet port, so that, when the strainer is placed in position in said elliptical passage, it will be eccentrically arranged with relation to the casing, and the distance between the side of the strainer and the wall of the casing, adjacent the inlet port, will be likewise materially less than the distance between the opposite portion of the strainer wall and the wall of the casing adjacent the outlet port. It follows, therefore, that the relative intervening distance between the strainer and casing walls gradually increases, at each side thereof, from points directly beneath the inlet port to points diametrically opposite, as shown in Figs. 4 and 5.

When the strainer is in the position above described, the water flowing into the inlet port will pass directly through the elliptical passage into the strainer, and, until the upper rear portion of the strainer becomes clogged, the flow will be principally directly through such portion into the outlet port. The flow may also be downward within the strainer and out into the casing through any portion of the strainer wall, so that the whole strainer surface will be effective.

The purpose of arranging the strainer eccentrically with relation to the casing is as follows:—All water passing through the portions of the strainer side wall nearest the inlet opening, either on a level therewith or beneath it, must then pass on in the direction of the flow, through the space between the strainer and casing walls. The volume of water supplied to this space will increase from points nearest the inlet opening to points diametrically opposite, as the water all travels in the same direction and is flowing into this space at all intermediate points. With this construction, however, this space is increased in volume to correspond, approximately to the rate of increase of the volume of water supplied thereto. The result is that the flow of water from the strainer portions nearest the inlet is not obstructed by that at points nearer the outlet, so that the flow through all portions of the strainer wall will be equalized, and, as the foreign matter collects, on the strainer wall, it will collect thereon at approximately the same rate. In consequence the strainer operates to the best advantage and obstructs the flow to a minimum extent at all times, considering the amount of foreign matter which may have been collected.

All solid matter, which cannot pass through the strainer walls, will be retained in the bucket-like device which the strainer forms, and may be readily removed by removing the cap $c$ and lifting out the strainer, by its bail, from the casing, so that it may be readily emptied and cleaned, and then returned to its position within the casing.

The above described construction affords a maximum straining area for the space occupied, with a minimum obstruction to the flow, and, at the same time, provides a form of strainer which may be easily cleaned, as above explained.

Under some conditions I prefer to omit the bottom of the strainer entirely, as shown in Fig. 6, in which case I connect a pipe $i$ to the lower end of the casing and place a valve $j$ therein, so that when it is desired to clean the bottomless strainer $d'$, the valve $i$ is merely opened and the rush of water through the strainer from top to bottom will remove the greater portion of the solid matter which has been collected. However, this method, while more convenient, is much less effective than the method of removing the strainer above described.

It will be understood that, while the herein described straining device is shown and described as employed in a horizontally disposed pipe, it may be employed in a pipe which extends vertically, or at any intermediate angle, the terms horizontal and vertical, as used in the specification and claim being used for convenience in description and therefore being merely relative.

I claim:—

In combination with a cylindrical casing having oppositely disposed inlet and outlet ports in its side wall, a cylindrical strainer open at its upper end, and arranged in said casing to extend longitudinally thereof, said strainer being continuously connected at its upper edge to the inner walls of the casing below said inlet port and above said outlet port, so that liquid passing from the inlet to the outlet port will pass into the upper end of the strainer and through its side walls, said strainer being eccentrically disposed within the casing with the wall portion thereof directly beneath the inlet port in substantially closer proximity to the casing than at other portions, so that the space between the strainer and casing walls increases in volume from the inlet to the outlet side of the casing, substantially as described.

In testimony whereof, I have signed my name to this specification, in the presence of two subscribing witnesses.

ROBERT CHARLES MONTEAGLE.

Witnesses:
L. H. HARRIMAN,
H. B. DAVIS.